(12) United States Patent
Blasco Claret et al.

(10) Patent No.: US 8,269,574 B2
(45) Date of Patent: Sep. 18, 2012

(54) DEVICE FOR INDUCTIVE MULTI-INJECTION ON MULTIPLE CONDUCTORS

(75) Inventors: Jorge Vicente Blasco Claret, Valencia (ES); José Luis González Moreno, Xirivella (ES); José María Vidal Ros, Valencia (ES)

(73) Assignee: Marvell Hispania, S.L.U., Madrid (ES)

( * ) Notice: Subject to any disclaimer, the term of this patent is extended or adjusted under 35 U.S.C. 154(b) by 221 days.

(21) Appl. No.: 12/681,463

(22) PCT Filed: Sep. 26, 2008

(86) PCT No.: PCT/ES2008/000610
§ 371 (c)(1),
(2), (4) Date: Jul. 23, 2010

(87) PCT Pub. No.: WO2009/043950
PCT Pub. Date: Apr. 9, 2009

(65) Prior Publication Data
US 2010/0289595 A1    Nov. 18, 2010

(30) Foreign Application Priority Data

Oct. 2, 2007 (ES) .................................. 200702566

(51) Int. Cl.
*H03H 2/00* (2006.01)
*H01F 27/28* (2006.01)
(52) U.S. Cl. ..................................... 333/24 R; 336/171
(58) Field of Classification Search ................ 333/24 R, 333/1; 336/170, 171; 365/130, 158
See application file for complete search history.

(56) References Cited

U.S. PATENT DOCUMENTS

| | | | |
|---|---|---|---|
| 3,566,373 A * | 2/1971 | Shackell | 365/97 |
| 4,328,564 A * | 5/1982 | Pryor | 365/130 |
| 5,587,943 A * | 12/1996 | Torok et al. | 365/158 |
| 6,906,947 B2 * | 6/2005 | Bloomquist et al. | 365/158 |
| 7,002,333 B2 * | 2/2006 | Blasco Claret et al. | 323/356 |
| 7,116,575 B1 * | 10/2006 | Katti | 365/158 |
| 7,120,048 B2 * | 10/2006 | Sundstrom | 365/158 |
| 2011/0109399 A1 * | 5/2011 | Blasco Claret et al. | 333/1 |

* cited by examiner

Primary Examiner — Dean O Takaoka

(57) ABSTRACT

Which permits the application of methods for increasing the performance of a communications system on a medium made up of N conductors and a reference plane by means of injecting signals inductively in up to N combinations of the conductors, including injection in common mode, such that said injected signals can be made to be orthogonal to each other.

8 Claims, 4 Drawing Sheets

DEVICE FOR INDUCTIVE MULTI-INJECTION ON MULTIPLE CONDUCTORS

OBJECT OF THE INVENTION

As stated in the title of this descriptive specification, the following invention relates to a device for inductive multi-injection on multiple conductors.

In any communications system one aims to exploit as much as possible the characteristics of the communications medium in order to achieve the maximum transmission capacity, reliability, coverage, etc. In the case of the communications medium being made up of multiple conductors it is possible to use those conductors in order to achieve one or several of these objectives. There exist methods in the state of the art both for enhancing the quality of the communication and for increasing the reutilization of frequencies, among other applications, but they need the signals to be injected properly in order to be able to do this.

The present invention reveals a device specially designed for performing inductive multi-injection on multiple conductors such that it becomes easier to implement methods for increasing the quality of the communications.

PRIOR ART OF THE INVENTION

Communications systems need a transmission medium for the signals, which is very often made up of multiple conductors. The presence of these multiple conductors can be exploited in order to enhance various features of the communications system, such as the transmission capacity or immunity to noise, among others. One of the ways of exploiting the multi-conductor medium is to use orthogonal modes, for which it is necessary to inject signals in that medium in the right way; this can be done inductively or in voltage.

The device of the invention is designed for being able to apply the method specified in Spanish patent with application number 200702256 relating to a "Method for increasing the performance of a communications system on a medium made up of multiple conductors", injecting the signals in the multi-conductor medium inductively. As occurred in this patent, the description of the inventive device uses various conventional concepts which are commented on below. "Mode" is understood to be the injection of voltage or current on a selective combination of conductors, reference plane or both. Likewise, "orthogonal multi-injection" is defined as being an injection of multiple modes orthogonal to each other. The injection modes are divided into common mode, differential modes and pseudo-differential modes. The common mode is that which causes circulation of currents via the reference plane. The differential modes consist of injection by a conductor and collection of the return via the other, while pseudo-differential modes consist of injection of voltage or current between one or more conductors and return via one or more conductors different from those used for the injection, the number of conductors used in this case being greater than two.

There exists in the state of the art some patents with methods intended to increase the performance of a communications system when the medium is a multi-conductor which leave unsolved the problem of carrying out the injection in that medium. The inventive device solves this shortcoming and focuses on the specific way of carrying out inductive injection on that medium in order to achieve orthogonality among the injections; it therefore solves the stated problem and as a consequence it is not anticipated by the documents existing in the state of the art.

Moreover, the state of the art also contains patents on inductive couplers, but which do not anticipate the present invention. One of these patents is document WO-03/063381-A1 known as "Coupling device", which describes an inductive method of coupling for zones where it is necessary to inject on different branches of the electrical network and where those injections are carried out differentially on two conductors of each branch. Given that, with the method described, it is not possible to carry out orthogonal multi-injection on multiple conductors with injections in common, differential and pseudo-differential mode, said patent being referred to does not anticipate the inventive device.

DESCRIPTION OF THE INVENTION

In order to achieve the objectives and avoid the drawbacks stated in previous sections, the invention consists of a device for inductive multi-injection on multiple conductors which permits the application of methods for increasing the performance of a communications system on a medium made up of N conductors and a reference plane. Said device is made up of the following elements and connections: E signal inputs, where E is between 1 and N, for each one of the signals to inject between the conductors; A inductive couplers, A being equal to or greater than twice the number of signal inputs (2×E), where the specific number of inductive couplers used in the device depends on the number of injection modes and on the number of conductors used by each of those modes, and in which the conductor passes through the gap in the inductive coupler on one or more occasions; E signal injection loops, each one of which injects in a differential mode, pseudo-differential mode or common mode, which pass through the couplers located around the conductors on which said loop is going to inject current, and the direction in which the loop traverses each inductive coupler determines the direction of the current it is wished to inject in the conductor; and the number of turns of each injection loop on each coupler or of each conductor on each coupler is such that injections are achieved in differential mode, pseudo-differential mode or common mode. Thanks to the device, it is possible to inject communications signals in up to N combinations of the conductors in such a way that said signals injected are orthogonal to each other.

In this device the signal inputs that are injected in differential mode or pseudo-differential mode are balanced and are connected to the two ends of each loop, while the signal input that is injected in common mode is referred to the reference plane and connected to one of the ends of the loop used for injection in common mode, the other end of the loop being connected to the reference plane.

The inductive couplers used in the device are elements with high magnetic permeability such as nanocrystalline materials or ferromagnetic ceramic materials, and whose shape allows them to be traversed by the conductors and by the loops.

In an embodiment of the inventive device, the number of couplers is equal to the number of conductors used by the different injections, such that all the injections that apply current in a conductor will use the inductive coupler associated with that conductor.

In this case, each conductor will only traverse the coupler associated with it once, while the injection loops will traverse that coupler as many times as necessary for maintaining a suitable ratio of currents for achieving orthogonal injections.

In another alternative embodiment of the device, the number of couplers is equal to the number of injection modes used, such that each injection mode has a single coupler associated with it.

In this case, each coupler is traversed by a single loop once only, while conductors used by the injection mode associated with the coupler traverse that coupler as many times as necessary for maintaining a suitable ratio of currents for achieving orthogonal injections.

Finally, although the inventive device can be used in any multi-conductor medium, it is specifically developed for the case in which the communications channel made up of multiple conductors is the electrical network.

Below, in order to facilitate a better understanding of this descriptive specification and forming an integral part thereof, some figures are attached in which the object of the invention has been represented by way of illustration and non-limiting.

DESCRIPTION OF VARIOUS EXAMPLES OF EMBODIMENT INVENTION

Given below is a description of various examples of embodiment of the invention, with reference to the numbering adopted in the figures.

Theoretically, it is possible to use the property that the transmission medium is made up of multiple conductors in order to successfully maximize the performance of a communications system using that transmission medium. In fact, it is possible to achieve a method that distributes the currents in a multi-conductor medium in such a way that the signals are injected orthogonally into that medium, with which a lower level of interference among injections, greater coverage, etc., are achieved. The main problem of these methods is the injection of the signals in the multi-conductor medium.

The inventive device is capable of carrying out that inductive injection optimally in order to follow the desired method for increasing the communication capacities of a system which uses that multi-conductor medium.

Figure 1:
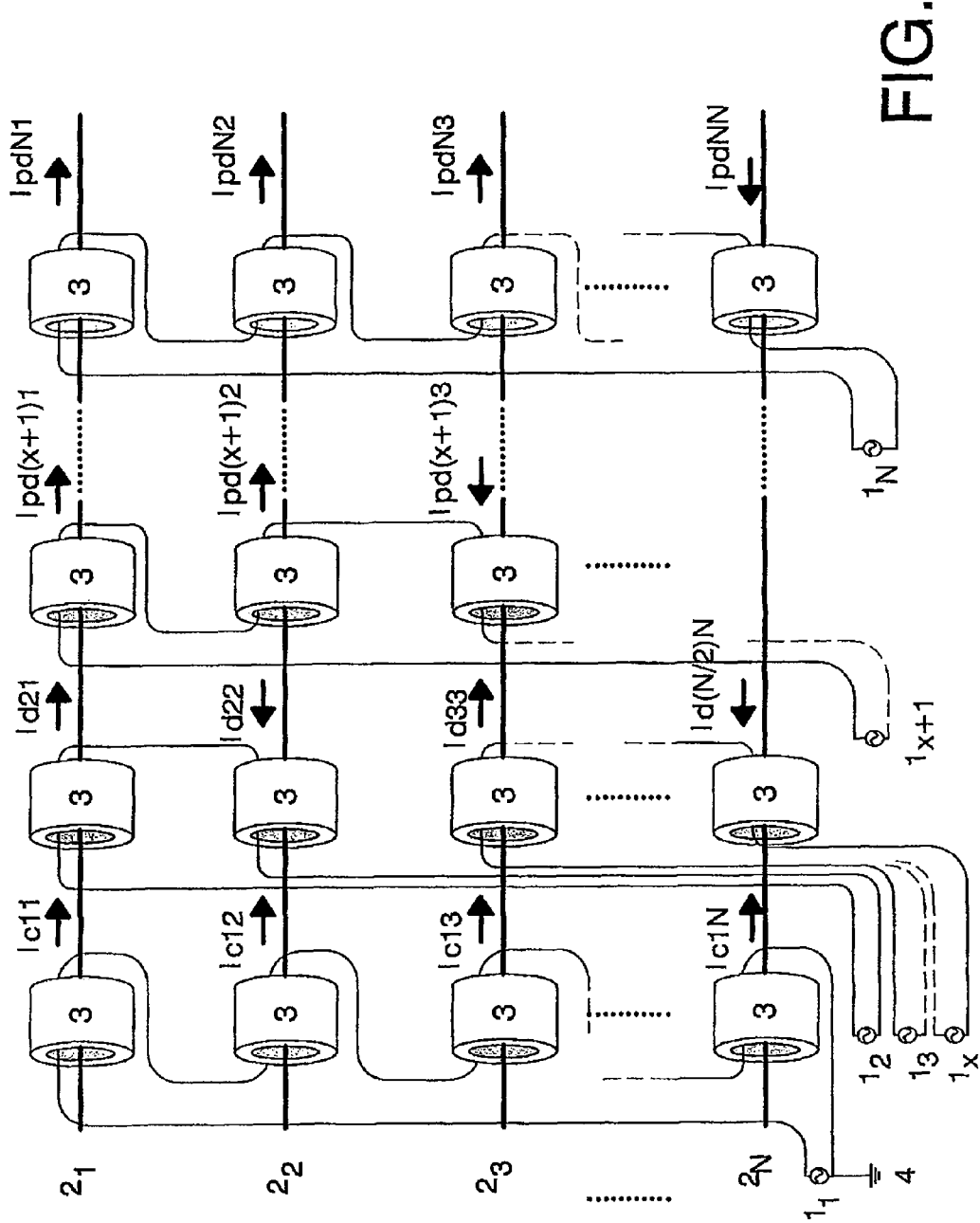
FIG. 1. —Shows an example of the multi-injection device with N signals on N conductors with their different elements and connections.

FIG. 1 represents an example of embodiment in which is shown a channel of N conductors referred to a reference plane (4) where N injections are carried out by means of the inductive multi-injection device. In this example, there is an even number of N conductors ($2_1$ to $2_N$) and N input signals ($1_1$ to $1_N$) which are divided into a signal that will be injected in common mode ($1_1$), multiple signals that will be injected in differential mode ($1_2$ to $1_x$) and multiple signals that will be injected in pseudo-differential mode ($1_{x+1}$ to $1_N$). Likewise, in this example of embodiment there is an inductive coupler (3) for each conductor and injection used. In order to achieve orthogonal injections the conductors where the signals are injected, the direction of the injected current and the number of turns of the injection loop will be the appropriate ones according to the method for increasing the performance of the characteristics of the communication used.

As can be seen in the above figure, the injection in common mode has its return via the reference plane (4), while the differential and pseudo-differential modes create currents solely on the conductors ($2_1$ to $2_N$).

The number of maximum differential modes depends on the number of conductors, being N/2 for an even number of conductors and (N−1)/2 for an odd number.

In order to aid an understanding of FIG. 1, the currents that have been drawn on the different conductors have three subscripts. The first indicates whether it is common mode (c), differential mode (d) or pseudo-differential mode (pd); the second is the number of the injected signal (which goes from 1 to N); and the third is the number of the conductor via which the current is distributed (which also goes from 1 to N in this example).

Figure 2:
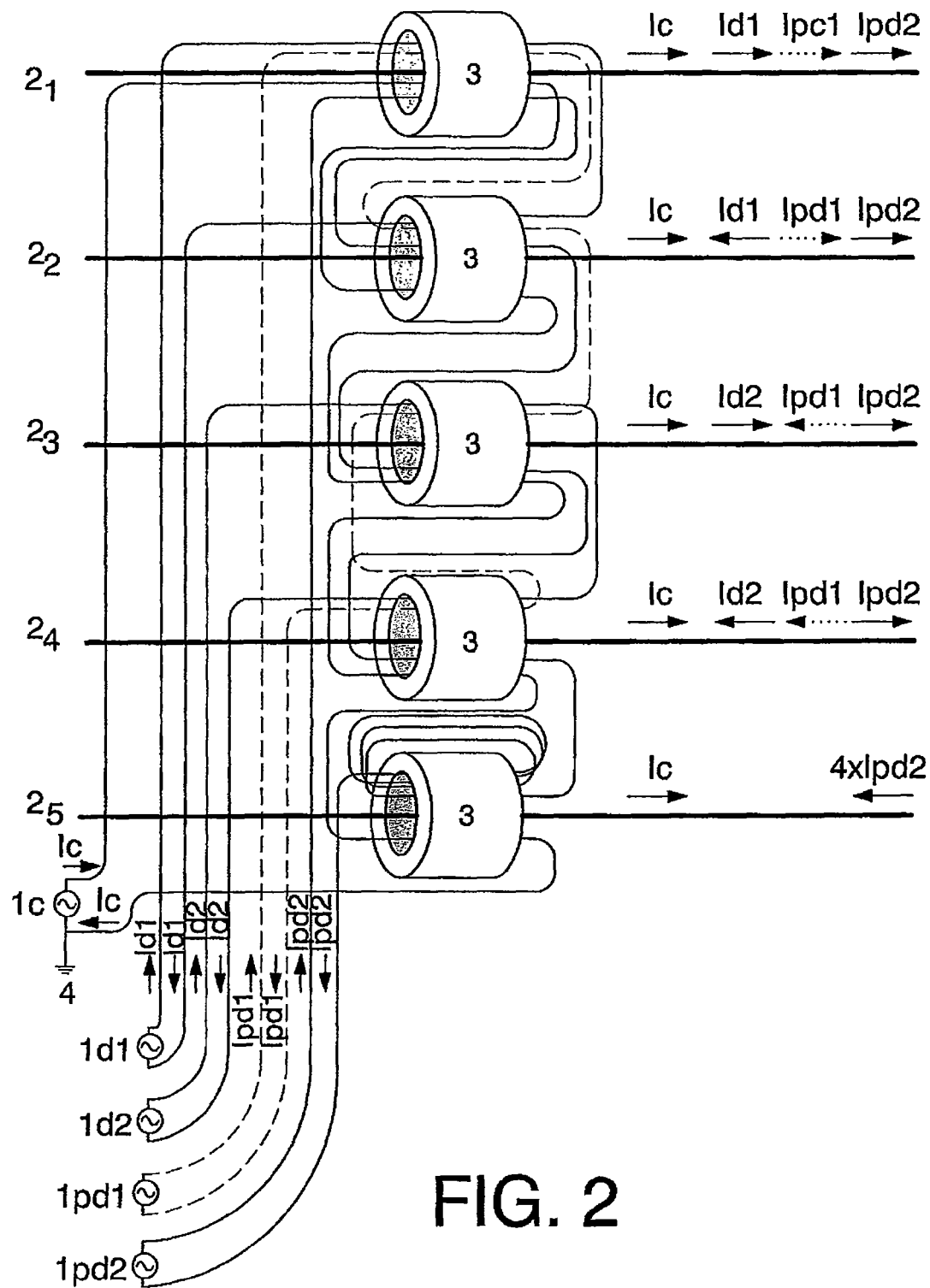
FIG. 2. —Represents an embodiment of the invention in which each conductor is associated with a single inductive coupler.

Another example of embodiment can be seen in FIG. 2, where the device is shown on a channel made up of five conductors ($2_1$ to $2_5$) referred to a reference plane (4). In this case, just one coupler (3) is used for each conductor, which drastically reduces the number of inductive couplers used. Each one of the injection modes that need to couple signal in a particular conductor will have to use the coupler for that conductor. This means that several injection loops of different modes can pass on the same coupler enveloping a conductor. The conductors (2) only pass once through their inductive coupler (3) but the injection loops will pass through the coupler as many times as necessary in order to guarantee the coupling proportion that grants the characteristic of orthogonality among the injected modes, and which will be determined by the method of increasing performance used on the inventive device.

In this FIG. 2 the inputs have been drawn that are going to be coupled in common mode ($1_c$), in differential mode ($1_{d1}$ and $1_{d2}$) and in pseudo-differential mode ($1_{pd1}$ and $1_{pd2}$). These inputs produce currents that will be coupled in common mode ($I_c$), in differential mode ($I_{d1}$ and $I_{d2}$) and in pseudo-differential mode ($I_{pd1}$ and $I_{pd2}$). The loops that carry the signals between the different couplers must be such that orthogonality of signals is produced, according to the method used on the device. In this case, the loop of the second pseudo-differential coupling has to give four turns to the coupler (3) located in the lowest conductor ($2_5$) in order to obtain the right value of current on that conductor. The condition of orthogonality of the injections on the conductors determines the direction of the injected currents and the number of turns of the injection loop or of each conductor via the inductive couplers. The equivalent electrical model of each inductive coupling corresponds to a transformer with one or more shared windings or not, where the windings will on the one hand be the injection loops and on the other hand the conductors. Assuming the condition of adaptation of impedances, the distribution of currents of each coupling in the conductors that can be seen in FIG. 2 takes place.

Figure 3:
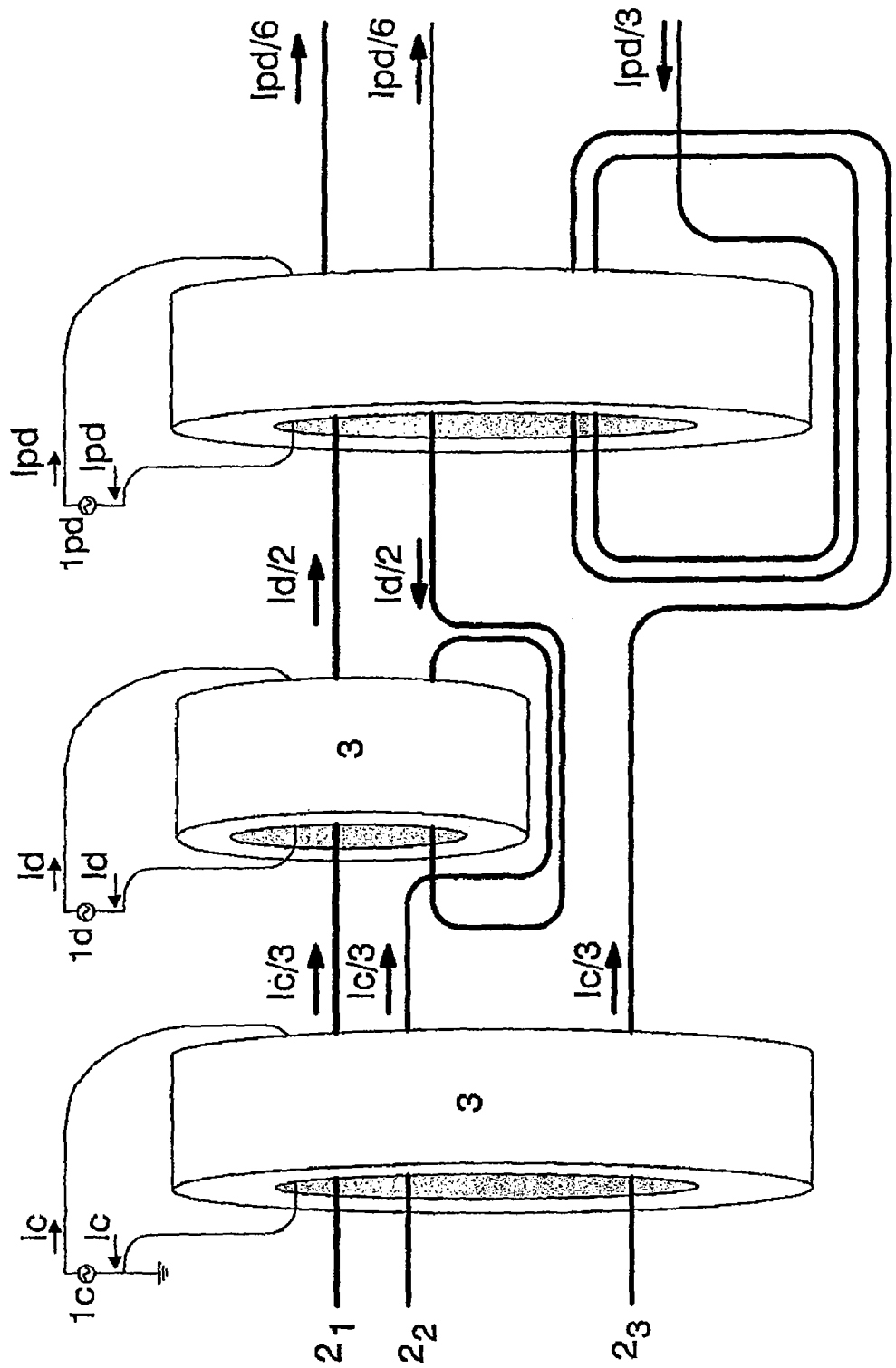
FIG. 3. —Shows an embodiment of the invention in which each injection mode is associated with a single inductive coupler.

Moreover, FIG. 3, shows another embodiment of inductive coupling in the inventive device, where each injection mode has a single coupler (3) associated with it, via which pass the conductors on which the mode has to couple the signal. In this case there are three conductors ($2_1$, $2_2$ and $2_3$) on which are going to be injected a common mode signal ($1_c$), a differential mode signal ($1_d$) and another in pseudo-differential mode ($1_{pd}$). These input signals will produce corresponding currents ($I_c$, $I_d$ and $I_{pd}$) which will be coupled inductively to the conductors.

In this example of embodiment, it is the conductors which traverse the inductive couplers (3) with the appropriate number of turns and in the right direction for guaranteeing the property of orthogonality in the signals between the different conductors (2). The injection loops, on the other hand, will only pass through their inductive coupling once. The figure shows an embodiment on a total of three conductors where up to three orthogonal injection modes are possible. In this case, as shown in FIG. 3, the distribution of currents would be $I_c/3$ per conductor for the common mode current, $I_d/2$ per conductor for the differential mode current and $I_{pd}/3$ or $I_{pd}/6$ per conductor for the pseudo-differential mode currents.

Figure 4:
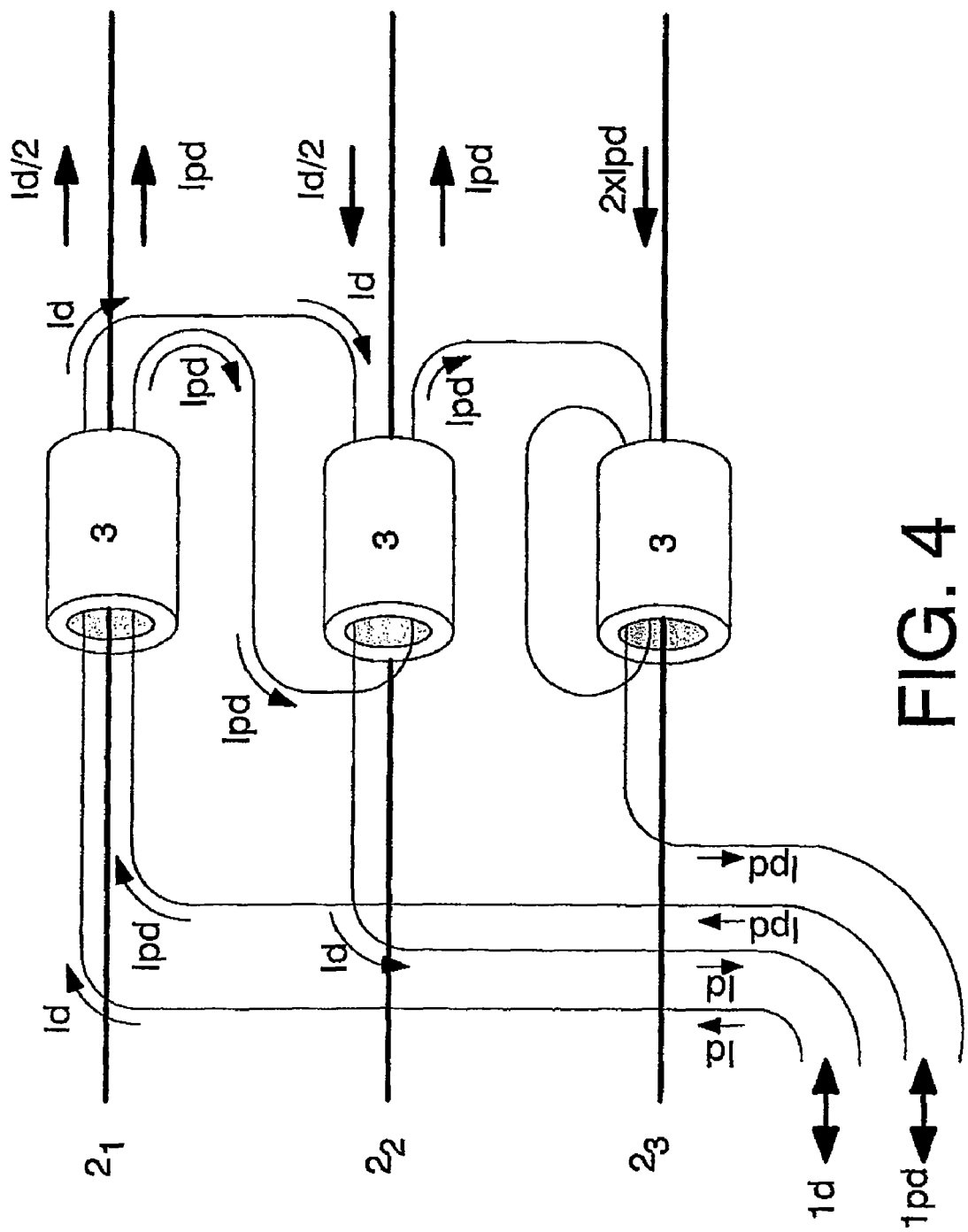
FIG. 4. —Represents an example of embodiment in a medium with three conductors in which just two injections are carried out, a differential injection and another pseudo-differential one.

Finally, FIG. 4 shows an example of embodiment on a channel of three conductors (2₁, 2₂ and 2₃) where just the inductive couplings of the differential and pseudo-differential modes have been implemented. In general, the common mode displays higher signal losses and greater interference from radiation, and so it is not normally used in real implementations in order to comply with standards and the different international regulations on radiation.

In this case, there will be two signal inputs, one which will be injected in differential mode (1$_d$) and the other in pseudo-differential mode (1$_{pd}$), which will generate their corresponding currents ($I_p$ and $I_{pd}$). Each conductor has its own coupler (3) such that the conductors (2₁, 2₂, 2₃) only traverse the coupler once, while the loops which connect with the signal inputs have to traverse the loop the appropriate number of times and in the right direction for achieving orthogonality among the injections.

Specifically, the differential loop traverses the coupler (3) of the upper conductor (2₁) in the forward direction and the coupler (3) of the middle conductor (2₂) in the reverse direction, with which half the differential current ($I_d/2$) is generated in opposing directions in the two conductors (2₁ and 2₂). The pseudo-differential loop, on the other hand, traverses the couplers (3) of the upper conductor (2₁) and intermediate conductor (2₂) in the forward direction, and the coupler (3) of the lower conductor (2₃) in the reverse direction giving two turns. Thanks to this, a pseudo-differential current ($I_{pd}$) is generated in the forward direction in the upper conductor (2₁) and middle conductor (2₂) and double in the opposite direction ($2 \times I_{pd}$) in the lower conductor (2₃). It can be proven theoretically that injections of this form that are made are orthogonal, $I_{pd1}$ and $I_{pd2}$.

What is claimed is:

1. A device for inductive multi-injection on multiple conductors, intended for permitting an application of methods for increasing performance of a communications system on a medium made up of N conductors and a reference plane, the device is characterized in that the device is made up of:

E signal inputs, where E is between 1 and N, for each one of a plurality of signals to inject in the N conductors;

A inductive couplers, A being equal to or greater than twice the number of signal inputs E, where the number of inductive couplers A used in the device depends on a number of injection modes and on a number of conductors used by each one of the injection modes, and where a conductor of the N conductors passes through a gap in one of the A inductive couplers on one or more occasions; and E signal injection loops, each one of which provides a mode selected from a differential mode, a pseudo-differential mode and a common mode, wherein the E signal injection loops pass through the A inductive couplers located around the N conductors on which said E signal injection loops are going to inject current, and a direction in which the E signal injection loops traverse each of the A inductive couplers determines a direction of the current injected in each of the N conductors, wherein selectively a number of turns of each of the E signal injection loops on each of the A inductive couplers and a number of turns of each of the N conductors on each of the A inductive couplers is such that injections are achieved for the differential mode, the pseudo-differential mode and the common mode, in order to inject communications signals in up to N combinations of the N conductors and obtain injected signals that are orthogonal to each other.

2. The device for inductive multi-injection on multiple conductors according to claim 1, the device further characterized in that:

the E signal inputs injected in one of the differential mode and the pseudo-differential mode are balanced and are provided to two ends of each of the E signal injection loops;

a signal input that is injected during the common mode is referred to as the reference plane and provided to one of the two ends of one of the E signal injection loops used for injection in the common mode; and the other of the two ends of the one of the E signal injection loops is connected to the reference plane.

3. The device for inductive multi-injection on multiple conductors according to claim 1, the device further characterized in that the A inductive couplers:

are elements with a high magnetic permeability selected from nanocrystalline materials and ferromagnetic ceramic materials; and have shapes that allow the A inductive couplers to be traversed by the N conductors and by the E signal injection loops.

4. The device for inductive multi-injection on multiple conductors according to claim 3, the device further characterized in that the number of inductive couplers A is equal to a number of conductors N used by the injections, such that all of the injections in which a current is applied in one of the N conductors includes using one of the A inductive couplers associated with the one of the N conductors.

5. The device for inductive multi-injection on multiple conductors according to claim 4, the device further characterized in that:

each of the N conductors only traverses one of the A inductive couplers; and the E signal injection loops traverse the one of the A inductive couplers as many times as necessary for maintaining a suitable ratio of currents for achieving orthogonal injections.

6. The device for inductive multi-injection on multiple conductors according to claim 3, the device further characterized in that the number of inductive couplers A is equal to a number of injection modes used, such that each of the injection modes is associated with a single coupler.

7. The device for inductive multi-injection on multiple conductors according to claim 6, the device further characterized in that each of the A inductive couplers is traversed by a one of the E signal injection loops only once.

8. The device for inductive multi-injection on multiple conductors according to claim 1, the device further characterized in that a communications channel made up of multiple of the N conductors is an electrical network.

* * * * *